United States Patent
Bhattacharya et al.

(10) Patent No.: US 11,354,500 B2
(45) Date of Patent: Jun. 7, 2022

(54) ARTIFICIAL INTELLIGENCE FOR IDENTIFYING RELEVANT CONTENT RELATED TO SPECIFIC TASKS

(71) Applicant: Microsoft Technology Licensing, LLC, Redmond, WA (US)

(72) Inventors: Pamela Bhattacharya, Redmond, WA (US); Barun Patra, Seattle, WA (US); Charles Yin-Che Lee, Mercer Island, WA (US); Vishwas Suryanarayanan, Los Angeles, CA (US); Chala Fekadu Fufa, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 360 days.

(21) Appl. No.: 16/706,498

(22) Filed: Dec. 6, 2019

(65) Prior Publication Data
US 2021/0174015 A1    Jun. 10, 2021

(51) Int. Cl.
| | | |
|---|---|---|
| *G06F 15/16* | (2006.01) | |
| *G06F 40/205* | (2020.01) | |
| *G06N 3/04* | (2006.01) | |
| *G06Q 10/10* | (2012.01) | |

(Continued)

(52) U.S. Cl.
CPC .......... *G06F 40/205* (2020.01); *G06N 3/049* (2013.01); *G06Q 10/107* (2013.01); *H04L 51/02* (2013.01); *H04L 51/04* (2013.01)

(58) Field of Classification Search
CPC ....... G06F 40/205; G06F 40/30; G06N 3/049; G06N 3/0445; G06Q 10/107; H04L 51/02; H04L 51/04
See application file for complete search history.

(56) References Cited

U.S. PATENT DOCUMENTS

| | | |
|---|---|---|
| 8,706,748 B2 | 4/2014 | Herlocker et al. |
| 9,547,647 B2 | 1/2017 | Badaskar |
| 9,858,925 B2 | 1/2018 | Gruber et al. |

(Continued)

OTHER PUBLICATIONS

Jean-Philippe, Robichaud, "Digital Assistant Extension Automatic Ranking and Selection, Application as Filed in U.S. Appl. No. 16/572,000", filed Sep. 16, 2019,, 42 Pages.

(Continued)

*Primary Examiner* — John B Walsh

(57) ABSTRACT

In non-limiting examples of the present disclosure, systems, methods and devices for identifying relevant content in a natural language input are presented. An email may be received. A machine learning model may be applied to the email. The machine learning model may have been trained to rank sentences based on their relevance to a schedule meeting task. The machine learning model may comprise: an embedding layer for generating an embedding for each word in the email; a distinct sentence aggregation layer for aggregating the embeddings for each word in the email into a distinct embedding for each of the sentences in the email; a contextual aggregation layer for aggregating each distinct embedding for each of the sentences into a contextual embedding for each of the sentences; and a scoring layer for scoring and ranking each of the sentences based on their relevance to the schedule meeting task.

20 Claims, 12 Drawing Sheets

(51) Int. Cl.
  *H04L 51/04* (2022.01)
  *H04L 51/02* (2022.01)

(56) References Cited

U.S. PATENT DOCUMENTS

| | | |
|---|---|---|
| 2005/0192992 A1* | 9/2005 | Reed .................... G06Q 10/107 |
| 2012/0151380 A1* | 6/2012 | Bishop .................. G06F 3/0486 |
| | | 715/752 |
| 2015/0278370 A1 | 10/2015 | Stratvert et al. |
| 2017/0161372 A1 | 6/2017 | Fern ndez et al. |
| 2018/0052824 A1 | 2/2018 | Ferrydiansyah et al. |
| 2019/0156198 A1 | 5/2019 | Mars et al. |
| 2020/0184017 A1* | 6/2020 | Batra ...................... G06F 16/95 |

OTHER PUBLICATIONS

Khabsa, et al., "Identifying Task Boundaries in Digital Assistants", In Proceedings of the Web Conference Companion, Apr. 23, 2018, pp. 107-108.

Laubheimer, et al., "Intelligent Assistants: Creepy, Childish, or a Tool? Users' Attitudes Toward Privileged and Confidential 13 RA/GG/PS1 Alexa, Google Assistant, and Siri", Retrieved from: https://www.nngroup.com/articles/voice-assistant-attitudes/, Aug. 5, 2018, 12 Pages.

Prakash, Abhay, "Techniques for Deep Query Understanding", In Journal of Computing Research Repository, May 19, 2015, 30 Pages.

* cited by examiner

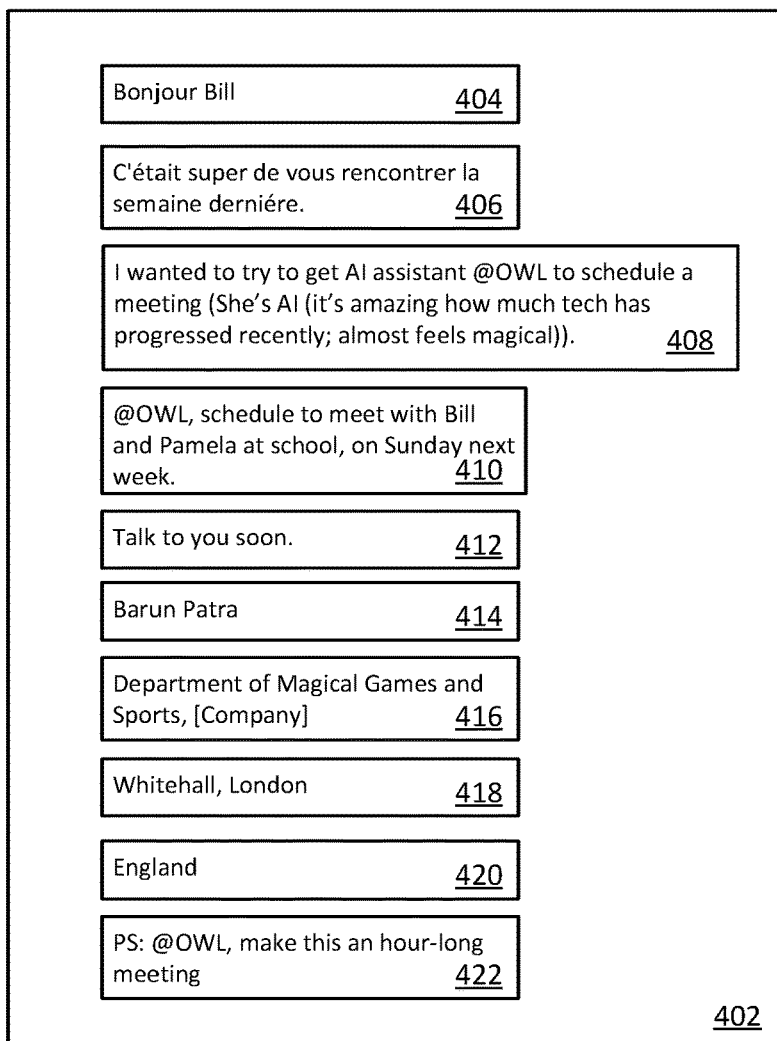
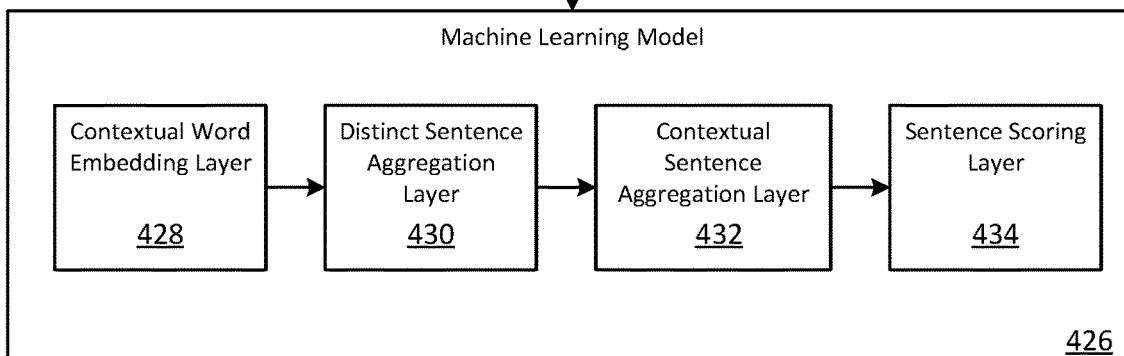
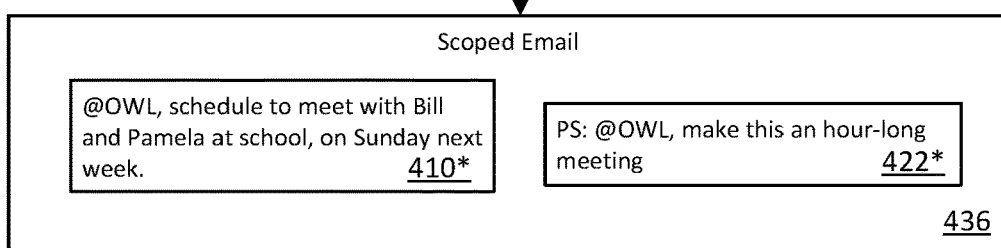
FIG. 4

ARTIFICIAL INTELLIGENCE FOR IDENTIFYING RELEVANT CONTENT RELATED TO SPECIFIC TASKS

BACKGROUND

Digital assistants have become integrated with many parts of personal and business tasks. Users have become accustomed to utilizing digital assistants for obtaining directions, checking the weather, and initiating real-time communications with other persons (e.g., finding a contact to call, initiating a phone or video call). As digital assistants have been given access to email functions, calendars, various productivity applications, and contact lists, users have started to utilize their digital assistants for a variety of tasks. However, digital assistants may be tasked with analyzing large documents to attempt to identify relevant content related to a task (e.g., a scheduling task). Those documents may contain many different entities that may appear to be relevant to the task, but in reality, they are false positives.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for identifying relevant content related to a task in a natural language input. A natural language input may be tokenized into sentences utilizing a sentence tokenizer. Those sentences may be fed to a machine learning model that has been trained to identify relevant content related to an identified task type in the natural language input. The machine learning model may have a plurality of layers. The machine learning model may include an embedding layer for generating an embedding for each word in each of the sentences, a distinct sentence aggregation layer for aggregating the embeddings for each word into a distinct embedding for each of the sentences, a contextual aggregation layer for aggregating each distinct embedding for each of the sentences into a contextual embedding for each of the sentences, and a scoring layer for scoring and ranking each of the sentences based on their relevance to the identified task type. Sentences from the natural language input that are identified as meeting or exceeding a minimum threshold value may be processed further by a digital assistant service to assist with completion of the identified task.

BRIEF DESCRIPTION OF THE DRAWINGS

Non-limiting and non-exhaustive examples are described with reference to the following figures:

FIG. 4 illustrates the processing of the natural language input from the email of FIG. 3.

DETAILED DESCRIPTION

Figure 1:
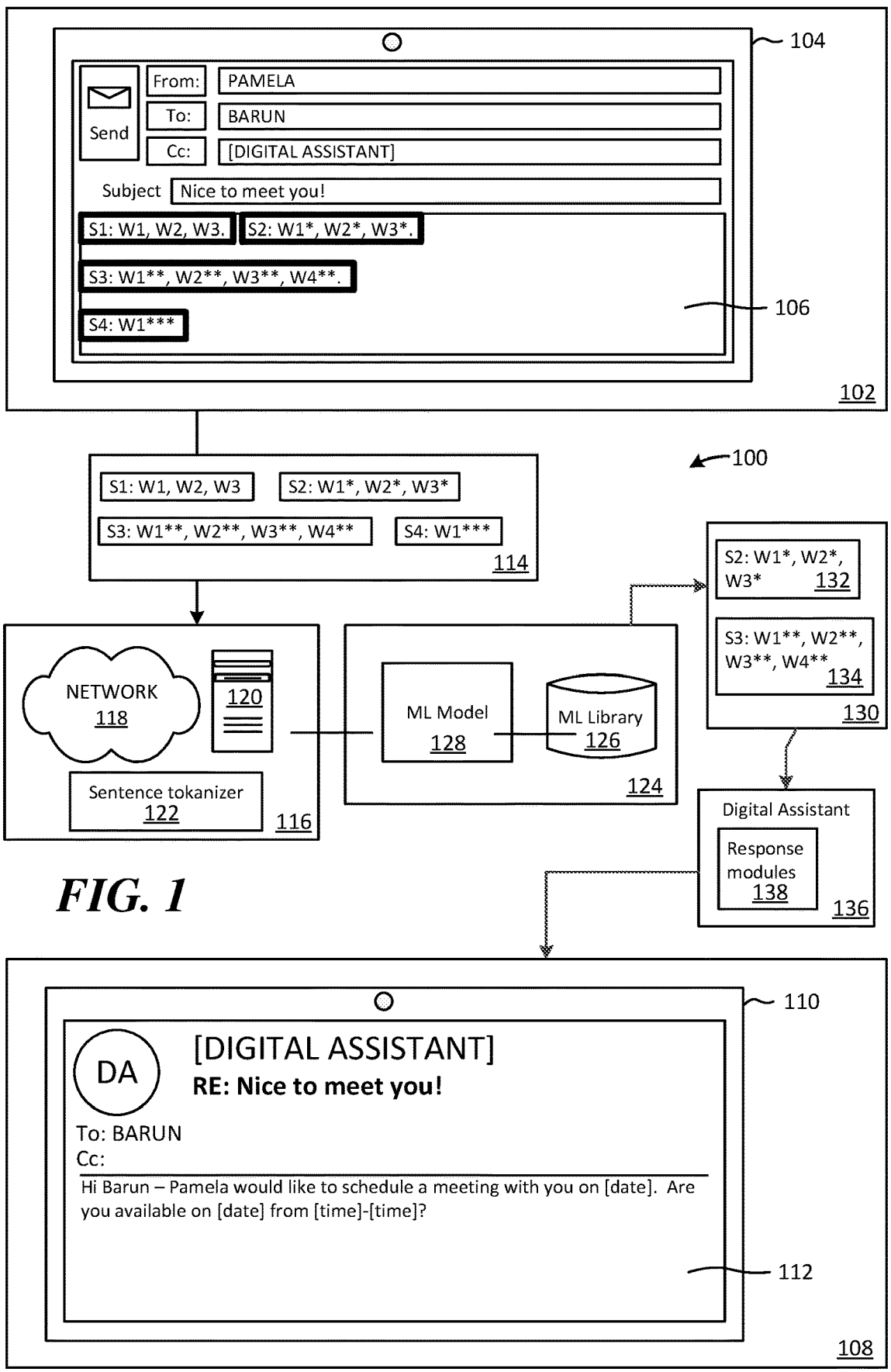
FIG. 1 is a schematic diagram illustrating an example distributed computing environment for utilizing artificial intelligence to identify relevant content in an email related to a schedule meeting task intent.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Examples of the disclosure provide systems, methods, and devices for identifying relevant content related to a task in a natural language input. According to examples, a natural language input may be received by a task content identification service. The task content identification service may be associated with a digital assistant service and/or an event scheduling assistant. In some examples, the natural language input may be received in the form of an electronic message. In other examples, the natural language input may be received in the form of a productivity application document (e.g., a word processing document, a spreadsheet document, a presentation document, a notes taking document, etc.).

According to examples, the task content identification service may apply one or more natural language processing models to the natural language input. Those natural language processing models may have been trained to identify and/or classify textual content into task types (e.g., "schedule meeting" task type, "insert object" task type, "summarize content" task type, "identify sentiment" task type, etc.). The task content identification service may tag and/or partition portions of the natural language input as sentences utilizing a sentence tokenizer. Thus, as used herein the term "sentence" refers to one or more words that are designated as a sentence by a sentence tokenizer, and a "sentence" need not be a complete sentence. A "sentence" may comprise a complete sentence, a sentence fragment, one or more stand-alone words, one or more abbreviations, one or more acronyms, and any combination of the same.

Once tokenized, each sentence may be processed by a machine learning model. In some examples, the machine learning model may be identified from a machine learning model library comprising a plurality of machine learning models. Each of the plurality of machine learning models may have been trained to identify relevant content related to a specific task type, where each machine learning model corresponds to a different task type. In other examples, there may be only a single machine learning model related to a single task type that is applied to the sentences. For example, the sentences may be processed by a single machine learning model that has been trained to identify relevant content related to a "schedule meeting" task type.

According to examples, the machine learning model may include an embedding layer for generating an embedding for each word in each of the sentences. The embedding layer may apply a contextual model to each sentence from the natural language input. In examples, the contextual model that is applied may be a bidirectional encoder representations from transformers (BERT) model. In other examples, the contextual model may be a Sent2Vec model, Embeddings from Language Models (ELMo), Recurrent Neural Networks etc.

The machine learning model may further comprise a distinct sentence level information aggregation layer ("distinct sentence aggregation layer") for aggregating the embeddings for each word into a distinct embedding for each of the sentences. The distinct sentence aggregation layer may apply a neural network to the embeddings for each word. In examples, the neural network may comprise a gated recurrent unit (GRU) neural network or bidirectional GRU (bi-GRU) neural network. In other examples, the neural network may comprise a long short-term memory (LSTM) neural network, an attention-based aggregation method, etc.

The machine learning model may further comprise a contextual aggregation layer for aggregating each distinct embedding for each of the sentences into a contextual embedding for each of the sentences. In aggregating the distinct embeddings for each sentence, the contextual aggregation layer may apply a neural network to each distinct embedding for each of the sentences. In examples, the neural network may comprise a GRU neural network, or bi-GRU neural network. In other examples, the neural network may comprise a long short-term memory (LSTM) neural network, an attention-based aggregation method, etc.

The machine learning model may further comprise a scoring layer for scoring and ranking each of the sentences based on their relevance to a task type (e.g., a "schedule meeting" task type). In scoring and ranking each sentence, the scoring layer may apply a classifier function to each contextual embedding for each of the plurality of sentences (e.g., the embeddings generated by the contextual aggregation layer). In examples, the classifier function may comprise a sigmoid function. Other activation functions (e.g. tanh, softplus, etc.) may be utilized for scoring each sentence.

According to examples, only sentences which have been ranked over a certain threshold may be further processed by the digital assistant and/or event scheduling service to assist with task completion. For example, the values that are calculated for each of the sentences from the natural language input via the scoring layer may be compared to a threshold value. If a sentence has a value that meets or exceeds the threshold value, that sentence may be further processed for task completion assistance by the digital assistant and/or event scheduling service. If a sentence has a value that does not meet or exceed the threshold value, the sentence may not be processed further. The threshold value may be adjusted manually or automatically and can be tuned based on the requirements of the downstream tasks.

The systems, methods, and devices described herein provide technical advantages for identifying relevant portions of large text documents (e.g., emails, productivity application documents) related to specific task types. The mechanisms described herein reduce false positives and outperform baseline models utilizing a layered processing model that incorporates contextual word-level processing, distinct sentence-level processing, contextual sentence-level processing, and a final sentence scoring level processing. The systems, methods, and devices described herein reduce processing costs associated with scheduling meetings. For example, back-and-forth email messages to and from scheduling entities and invitees are significantly reduced by providing the ability to automatically identify relevant meeting times, locations, attendees, and other relevant meeting entities. Task completion operations associated with other task types are also enhanced via the mechanisms described herein in that the layered model may be trained to identify relevant content related to a variety of task types. Once properly trained, the model may be applied to any number of document and/or text types. Reducing the number of false positives that are identified in documents may significantly reduce processing costs associated with training alternative models.

FIG. 1 is a schematic diagram illustrating an example distributed computing environment 100 for utilizing artificial intelligence to identify relevant content in an email related to a schedule meeting task intent. Computing environment 100 includes natural language input sub-environment 102, meeting request sub-environment 108, network and processing sub-environment 116, machine learning sub-environment 124, and digital assistant sub-environment 136. Any and all of the computing devices described herein may communicate with one another via a network, such as network 118.

Natural language input sub-environment 102 includes computing device 104. Computing device 104 displays draft email 106. Draft email 106 includes Pamela in the "from" field, Barun in the "To" field, a digital assistant in the "Cc" field, and the subject "Nice to meet you!". The body of draft email 106 includes a first sentence, which includes three words—"S1: W1, W2, W3", a second sentence, which includes three words—"S2: W1*, W2*, W3*", a third sentence, which includes four words—"S3: W1, W2, W3, W4", and a fourth sentence, which includes one word—"S4: W1*". As used herein, the term "sentence" refers to one or more words that are designated as a sentence by a sentence tokenizer, such as sentence tokenizer 122 in network and processing sub-environment 116**.

In addition to sentence tokenizer 122, network and processing sub-environment 116 includes network 118 and server computing device 120. One or more servers, such as server computing device 120, in network and processing sub-environment 116 may host a task content identification service and/or a digital assistant service. In some examples, the task content identification service may be included as part of a digital assistant service. In other examples, the task content identification service may be a separate service from the digital assistant service.

The task content identification service may include and/or be associated with one or more machine learning models. In this example, this is illustrated by machine learning sub-environment 124, which includes machine learning library 126 and machine learning model 128. Machine learning library 126 may include one or more machine learning models. In some examples, each machine learning model in machine learning library 126 may be trained to identify sentences that are relevant to a specific task type. For example, a first machine learning model may be trained to identify sentences that are relevant to a "schedule meeting" task type, a second machine learning model may be trained to identify sentences that are relevant to an "insert object" task type, and a third machine learning model may be trained to identify sentences that are relevant to an "identify sentiment" task type. Additional task types and corresponding machine learning models are contemplated. Additionally, while FIG. 1 includes a machine learning library, it should be understood that the task content identification service may be associated with a single task type (e.g., "schedule meeting" task type) and therefore the task content identification service may only include a single machine learning model. Additional details regarding the machine learning models and associated processing layers are discussed below in relation to FIG. 2.

Digital assistant sub-environment 138 includes response modules 136. Response modules 136 process sentences that are identified as being relevant to a specific task. Once processed, a digital assistant may perform one or more operations to assist with task completion related to the specific task and the sentences that were identified as being relevant to that task. Additional details regarding the response modules are discussed below in relation to FIG. 2.

In this example, once draft email 106 is sent, the task content identification service automatically receives it. The task content identification service receives the email because it included "digital assistant" in the "Cc" field. In other examples, the task content identification service may receive each email sent from a user account that has provided the task content identification service with access to the user's emails. That is, in some examples, the digital assistant need not be included as an addressee in an email for the task content identification service to receive the email.

The task content identification service processes the text in email 106 with sentence tokenizer 122. In this example, sentence tokenizer identifies four sentences. Those sentences are illustrated in sentence sub-environment 114 (i.e., S1, S2, S3, S4). Each of the identified sentences is then processed separately by machine learning model 128. In examples where machine learning library 126 includes a plurality of machine learning models which are each associated with a different task type, the task content identification service may first identify a task type associated with email 106 and subsequently select a machine learning model that corresponds to that task type. In other examples, a user may manually select which machine learning model to apply to an email or document. In this example, machine learning model 128 corresponds to a "schedule meeting" task type.

Machine learning model 128 includes a plurality of layers, which each of the four sentences is processed by. Machine learning model 128 includes an embedding layer for generating an embedding for each word in each of the sentences, a distinct sentence aggregation layer for aggregating the embeddings for each word into a distinct embedding for each of the sentences, a contextual aggregation layer for aggregating each distinct embedding for each of the sentences into a contextual embedding for each of the sentences, and a scoring layer for scoring and ranking each of the sentences based on their relevance to the schedule meeting task. Additional details related to the processing layers are provided below in relation to FIG. 2.

In the illustrated example, sentence two 132 and sentence three 134 are identified as being most relevant to the schedule meeting task. In examples, the scoring layer may generate a score for each of the sentences corresponding to a likelihood that a sentence relates to the "schedule meeting" task. According to additional examples, sentences for which a threshold score is met may be processed further via digital assistant response modules 138, and the sentences for which the threshold score was not met may not be processed further. Thus, in this example, sentence two 132 and sentence three 134 each have a score that meets the threshold and they are provided to digital assistant response modules 138 as illustrated by relevant sentence sub-environment 130.

Response modules 138 may include a plurality of processing layers which process the sentences that have been identified as being relevant to the "schedule meeting" task. The processing may be performed to generate one or more responses, actions, and/or operations by the digital assistant service that assist with completion of the "schedule meeting" task. As discussed more fully in relation to FIG. 2 below, response modules 138 may include an entity extraction layer, an entity classification layer, a response matching layer, and/or a response generation layer. Those layers may be utilized to identify relevant entities in the sentences that it processes, classify those entities by type (e.g., users/people/invitees, meeting locations, meeting times, meeting dates, meeting types, meeting duration, etc.), identify one or more appropriate responses, actions, and/or operations based on the entities, and generate, send and/or perform one or more of those responses, actions and/or operations.

Computing device 110 in meeting request sub-environment 108 displays email 112 that has been generated and sent by the digital assistant service based on processing of sentence two 132 and sentence three 134. Specifically, email 112 was sent from the digital assistant to "Barun" and states: Hi Barun—Pamela would like to schedule a meeting with you on [date]. Are you available on [date] from [time]-[time]."

Figure 2:
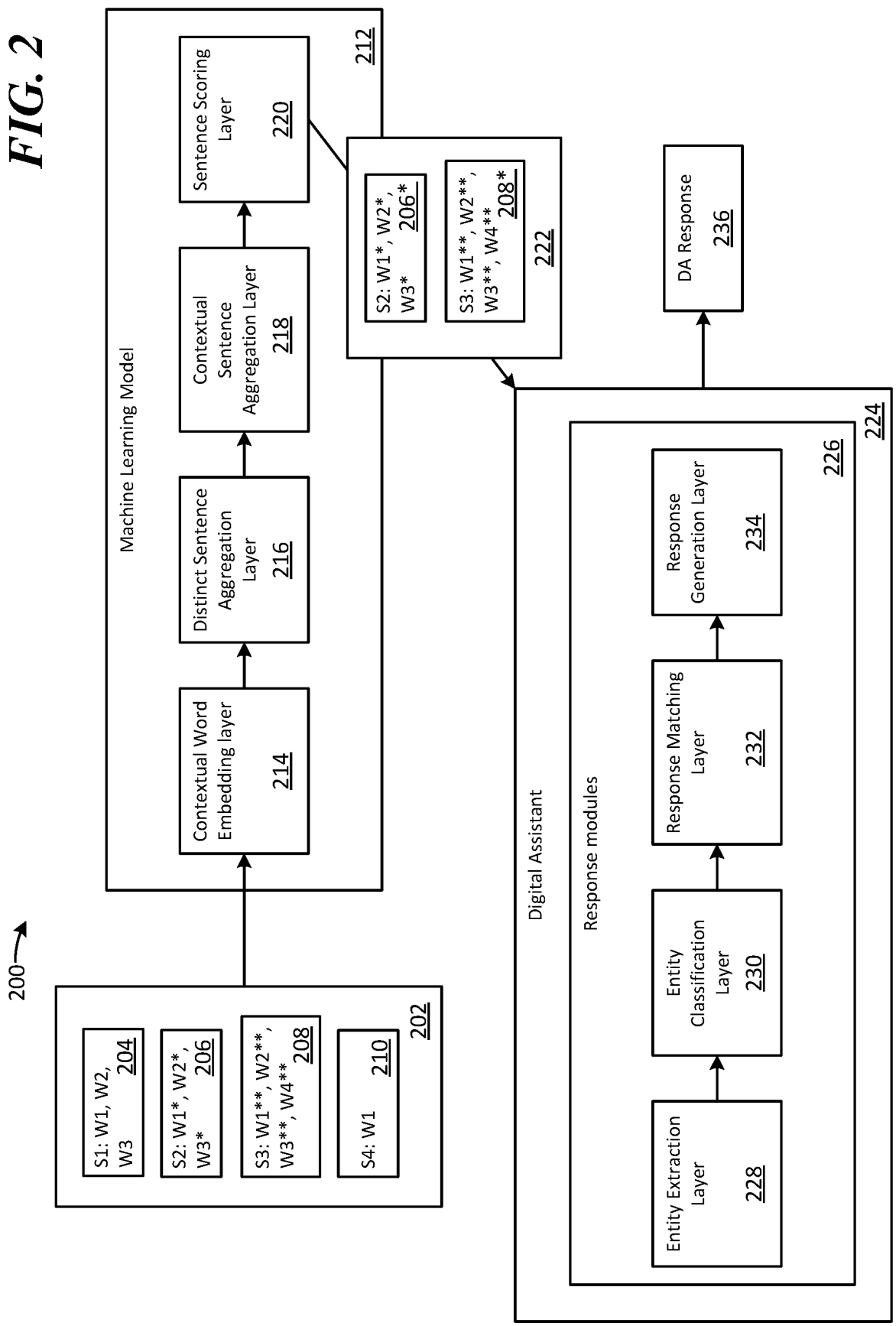
FIG. 2 illustrates layers of a machine learning model for identifying relevant content from a natural language input, and response modules of a digital assistant that receive that relevant content to generate meeting queries and invites.

FIG. 2 illustrates layers of a machine learning model for identifying relevant content from a natural language input, and response modules of a digital assistant that receive that relevant content to generate meeting queries and invites. Machine learning model 212 includes contextual word embedding layer 214, distinct sentence aggregation layer 216, contextual sentence aggregation layer 218, and sentence scoring layer 220. Machine learning model 212 receives sentences 202 from an email or other natural language input. In this example, sentences 202 includes four sentences: sentence one 204, sentence two 206, sentence three 208, and sentence four 210.

Each of sentences 202 is processed by machine learning model 212. Contextual word embedding layer 214 generates an embedding for each word in each of sentences 202. In generating an embedding for each word, contextual word embedding layer 214 may apply a contextual model to each of sentences 202. In examples, the contextual model that is applied may be a bidirectional encoder representations from transformers (BERT) model. In other examples, the contextual model may be a Sent2Vec model, Embeddings from Language Models (ELMo), Recurrent Neural Networks model, etc.

Distinct sentence aggregation layer 216 aggregates the embeddings for each word in sentences 202 into a distinct embedding for each of sentences 202. In aggregating the embeddings for each word, distinct sentence aggregation layer 216 may apply a neural network to the embeddings for each word. In examples, the neural network may comprise a gated recurrent unit (GRU) neural network or bi-GRU neural network. In other examples, the neural network may comprise a long short-term memory (LSTM) neural network.

Contextual sentence aggregation layer 218 aggregates each distinct embedding for each of sentences 202 into a contextual embedding for each of sentences 202. In aggregating the distinct embeddings for each sentence, contextual sentence aggregation layer 218 may apply a neural network to each distinct embedding for each of sentences 202. In examples, the neural network may comprise a gated recurrent (GRU) neural network or bi-GRU neural network. In other examples, the neural network may comprise a long short-term memory (LSTM) neural network.

Sentence scoring layer 220 scores and ranks each of sentences 202 based on their relevance to the schedule meeting task. In scoring each of sentences 202, sentence scoring layer 220 may apply a classifier function to each contextual embedding for each of the plurality of sentences (e.g., the embeddings generated by contextual sentence aggregation layer 218). In examples, the classifier function may comprise a sigmoid function. Other activation functions (e.g. tanh, softplus, etc.) may be utilized for scoring each sentence. In some examples, the model may be trained with a binary cross entropy loss using gold notated relevance scores. Other ways of training this model may include utilizing a margin-based hinge loss function.

According to examples, a threshold value may be utilized to determine which sentences to process by digital assistant 224, and specifically, response modules 226. For example, the values that are calculated for each of sentences 202 via sentence scoring layer 220 may be compared to a threshold value. If a sentence has a value that meets or exceeds the threshold value, that sentence may be processed by digital assistant 224. If a sentence has a value that does not meet or exceed the threshold value, that sentence may not be processed further. The threshold value may be adjusted manually or automatically. For example, as machine learning model 212 is trained, the threshold value may be lowered or increased. In this example, sentence two 206* and sentence three 208* have been determined to have met the minimum threshold and they are therefore sent to digital assistant 224 for processing in response modules 226, as indicated by relevant sentences 222.

Response modules 226 include entity extraction layer 228, entity classification layer 230, response matching layer 232, and response generation layer 234. Entity extraction layer 228 may identify and/or extract entities that are relevant to a schedule meeting intent. Entity classification layer 230 may classify those entities by entity type (e.g., users/people/invitees, meeting locations, meeting times, meeting dates, meeting types, meeting duration, etc.). Response matching layer 232 may identify one or more responses, actions, and/or operations that digital assistant 224 may perform, or cause to be performed, in relation to the task type (e.g., the "schedule meeting" task type). For example, where a "schedule meeting" task type is identified, response matching layer 232 may utilize the entities that were identified/extracted by entity classification 230 and generate one or more electronic messages to potential invitees of a meeting. Response generation layer 234 may perform, send, and/or execute the one or more responses, actions, and/or operations that were identified by response matching layer 232. Thus, in this example, response generation layer 234 generates digital assistant response 236, which may comprise one or more electronic messages and/or one or more application actions, for example.

Response modules 226 are provided for illustrative purposes and it should be understood that more, fewer, and/or different response modules may be applied to relevant sentences 222 to assist with task completion.

Figure 3:
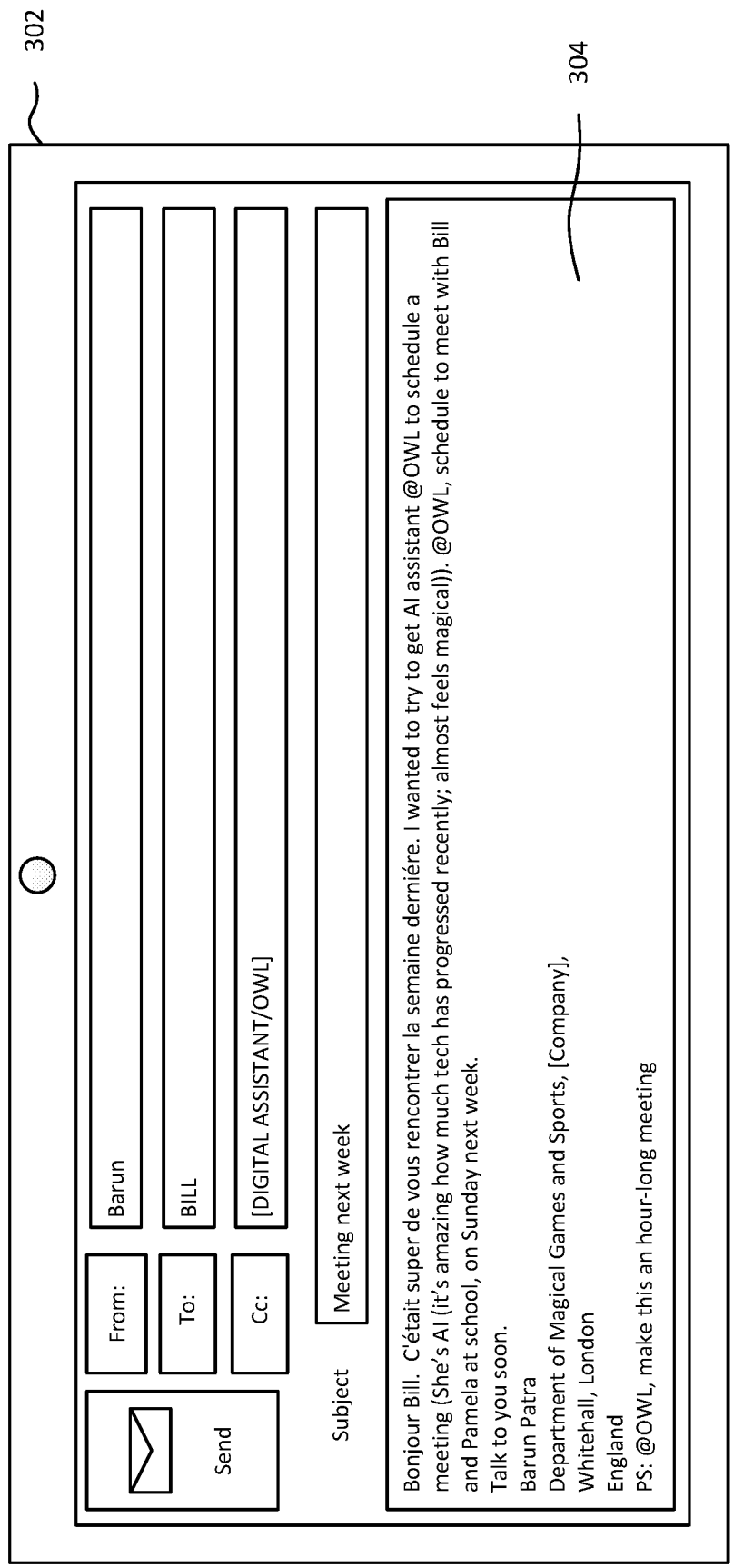
FIG. 3 illustrates a computing device that displays an exemplary email that includes a natural language input that may be processed by a machine learning model that has been trained to identify relevant content related to a schedule meeting task intent.

FIG. 3 illustrates a computing device 302 that displays an exemplary email 304 that includes a natural language input that may be processed by a machine learning model that has been trained to identify relevant content related to a schedule meeting task intent.

Email 304 includes "Barun" in the "From" field, "Bill" in the "To" field, "[Digital Assistant/OWL]" in the "Cc" field, and "Meeting next week" in the "Subject" field. The body of email 304 states: "Bonjour Bill. C'était super de vous rencontrer 1a semaine demiére. I wanted to try to get AI assistant @OWL to schedule a meeting (She's AI (it's amazing how much tech has progressed recently; almost feels magical)). @OWL, schedule to meet with Bill and Pamela at school, on Sunday next week. Talk to you soon. Barun Patra-Department of Magical Games and Sports, [Company]-Whitehall, London-England-PS: @OWL, make this an hour-long meeting". The processing of email 304 is discussed below in relation to FIG. 4.

FIG. 4 illustrates the processing of the natural language input from email 304 of FIG. 3. FIG. 4 includes sentences 402, machine learning model 426, and scoped email 436.

In this example, a tokenizer has been applied to email 304. Thus, although there are sentence fragments included in email 304 (e.g., Bonjour Bill; Barun Patra; Department of Magical Games and Sports, [Company]; Whitehall, London; England; PS: @OWL, make this an hour-long meeting), those sentence fragments have been tagged as sentences by the tokenizer in addition to the tokenizer tagging the complete sentences. Thus, sentences 402 includes: first sentence 404, second sentence 406, third sentence 408, fourth sentence 410, fifth sentence 412, sixth sentence 414, seventh sentence 416, eight sentence 418, ninth sentence 420, and tenth sentence 422.

Each of sentences 402 is provided to machine learning model 426, which has been trained to identify sentences that are relevant to a "schedule meeting" task type. That is, each of sentences 402 is processed by: contextual word embedding layer 428, distinct sentence aggregation layer 430, contextual sentence aggregation layer 432, and sentence scoring layer 434. Those layers are discussed in more detail in relation to FIG. 2 and specifically machine learning model 212.

In this example, a determination is made that fourth sentence 410 "@OWL, schedule to meet with Bill and Pamela at school, on Sunday next week." and tenth sentence 422 "PS: @OWL, make this an hour-long meeting" have a value determined by sentence scoring layer 434 that meets or exceeds a minimum threshold value. As such, those two sentences may be processed further by a digital assistant service to generate one or more appropriate responses to assist with the "schedule meeting" task.

Figure 5:
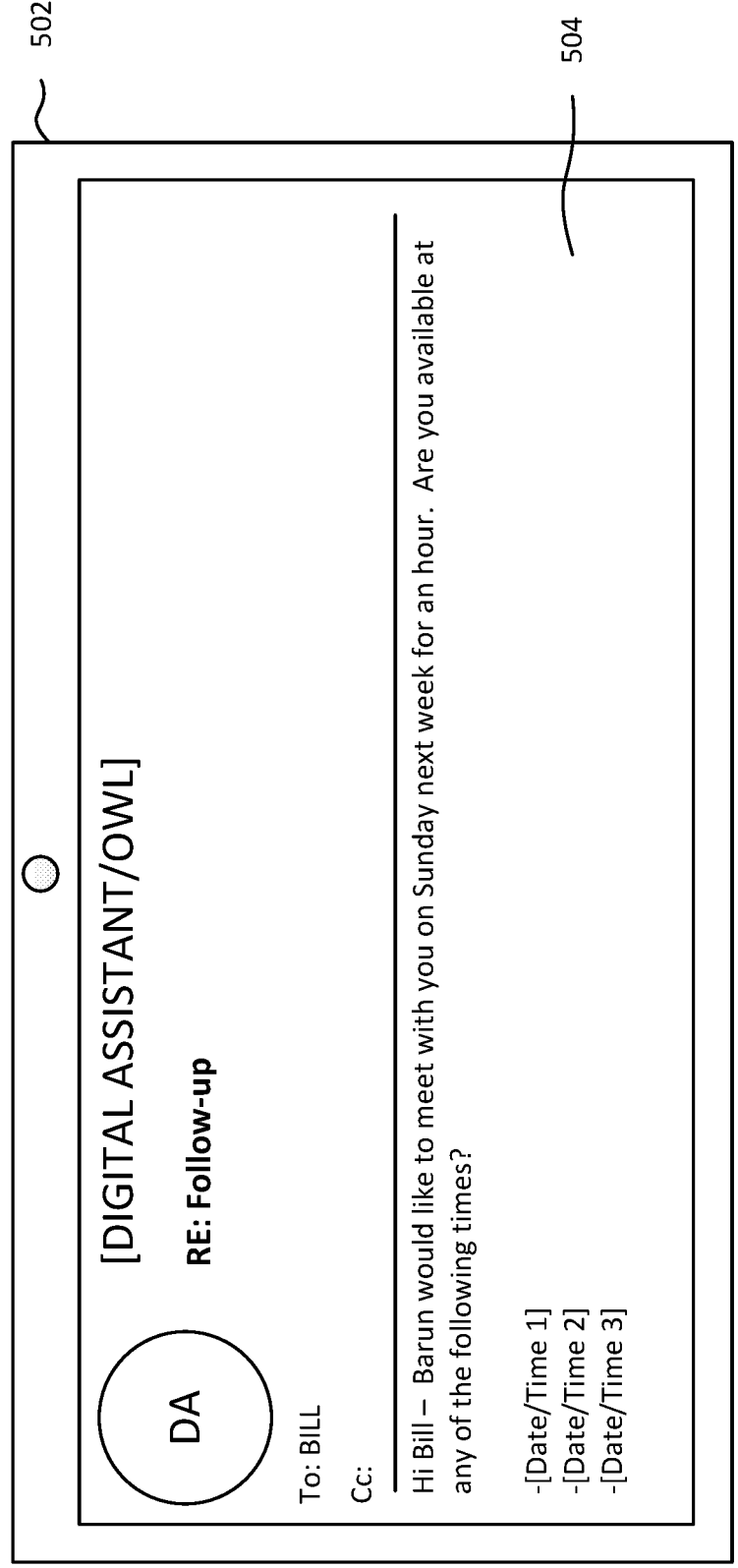
FIG. 5 illustrates a computing device that displays an email generated by a digital assistant after processing of the natural language input from the email of FIG. 3.

FIG. 5 illustrates a computing device 502 that displays an email 504 generated by a digital assistant after processing of the natural language input from the email of FIG. 3. Email 502 is sent from "[Digital Assistant/OWL]" to "Bill". Email 504 includes the subject "Follow-up" and the body states: "Hi Bill—Barun would like to meet with you on Sunday next week for an hour. Are you available at any of the following times? [Date/Time 1] [Date/Time 2] [Date/Time 3]". The digital assistant service (e.g., "Digital Assistant/ OWL"] may also generate and send a similar email to Pamela based on processing of fourth sentence 410 and tenth sentence 422.

Figure 6:
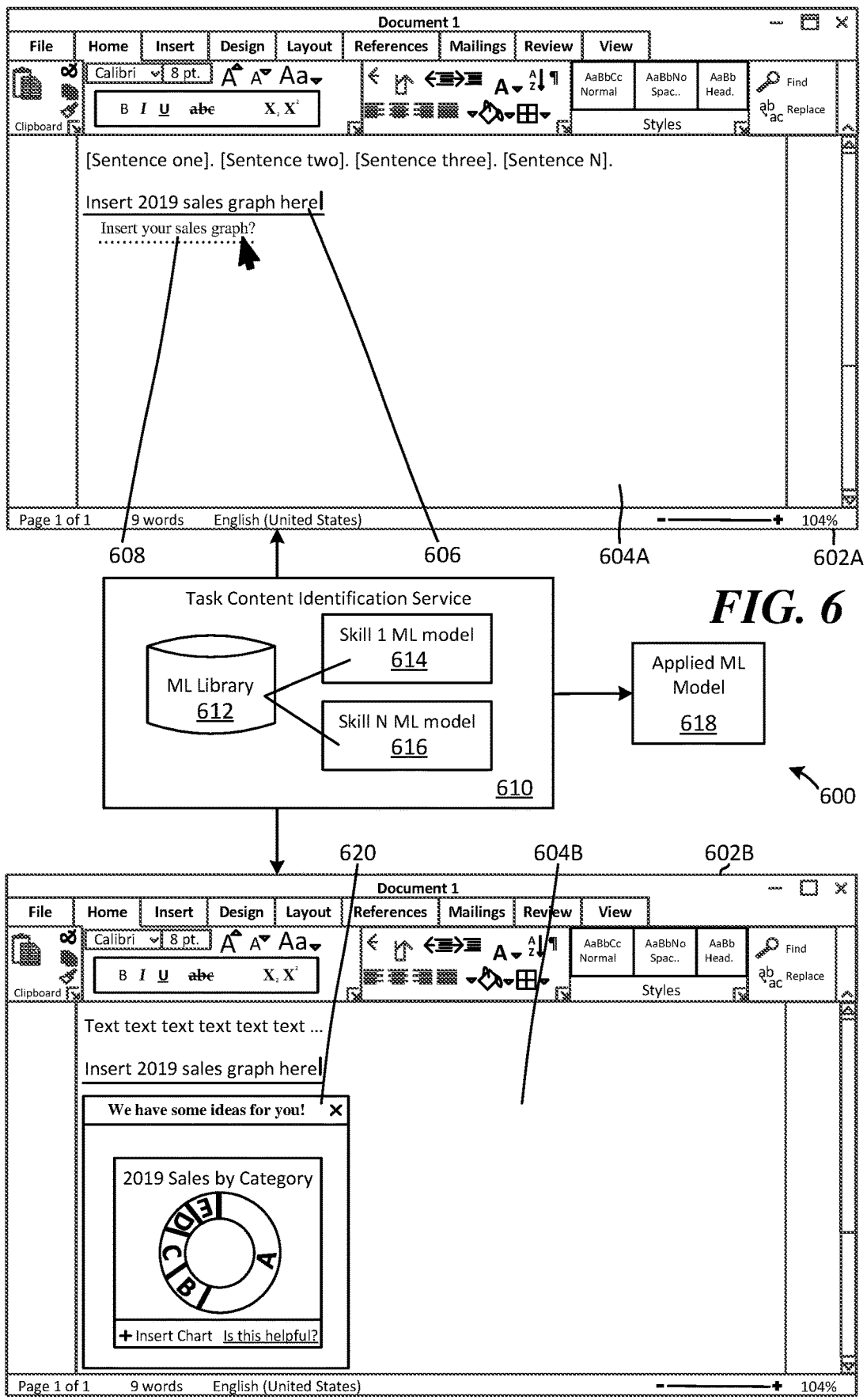
FIG. 6 illustrates a natural language input in a productivity application document that may be processed by a machine learning model to identify relevant content related to an insert object task intent.

FIG. 6 illustrates a natural language input in a productivity application document that may be processed by a machine learning model to identify relevant content related to an "insert object" task type. FIG. 6 includes productivity application document user interface 604A and productivity application document user interface 602B, which are both the same document at different times. FIG. 6 also includes Task Content Identification Service 610 and applied machine learning model 618.

Productivity application document user interface 602A displays a plurality of sentences ([Sentence one]. [Sentence two]. [Sentence three]. [Sentence N]) and the text "Insert 2019 sales graph here". In this example, the task content identification service may analyze that content utilizing one or more natural language processing models. Those models may be trained to identify a task type (e.g., "schedule meeting" task type, "insert object" task type, "perform search" task type). The task content identification service identifies an "insert object" task type. The task content identification service may match the identified task type to a machine learning model in machine library 612, which includes a plurality of machine learning models (e.g., skill 1 machine learning model 614, skill N machine learning model 616), each of which may have been trained to identify relevant content for a different task type. Thus, in this example, the task content identification service identifies applied machine learning model 618 which has been trained to identify content that is relevant to the identified "insert object" task type.

Machine learning model 618 includes a plurality of layers, which each of the sentences (including sentence 606) are processed by. Machine learning model 618 includes an embedding layer for generating an embedding for each word in each of the sentences, a distinct sentence aggregation layer for aggregating the embeddings for each word into a distinct embedding for each of the sentences, a contextual aggregation layer for aggregating each distinct embedding for each of the sentences into a contextual embedding for each of the sentences, and a scoring layer for scoring and ranking each of the sentences based on their relevance to the schedule meeting task. Additional details related to the processing layers are provided above in relation to FIG. 2.

In this example, a determination is made by machine learning model 618 that a value calculated by the scoring layer for sentence 606 ("Insert 2019 sales graph here") meets or exceeds a minimum threshold value. As such, that sentence is provided to a digital assistant service for processing. The digital assistant service matches sentence 606 to one or more operations, actions or responses. In this example, the digital assistant causes, based on that matching, selectable element 608 to be displayed on productivity application document user interface 604A, which states: "Insert your sales graph?". Selectable element 608 is interacted with (e.g., via a mouse click, via a touch input, via a voice input), and graph 620 is automatically inserted in the document as illustrated on productivity application document user interface 604B.

Figure 7:
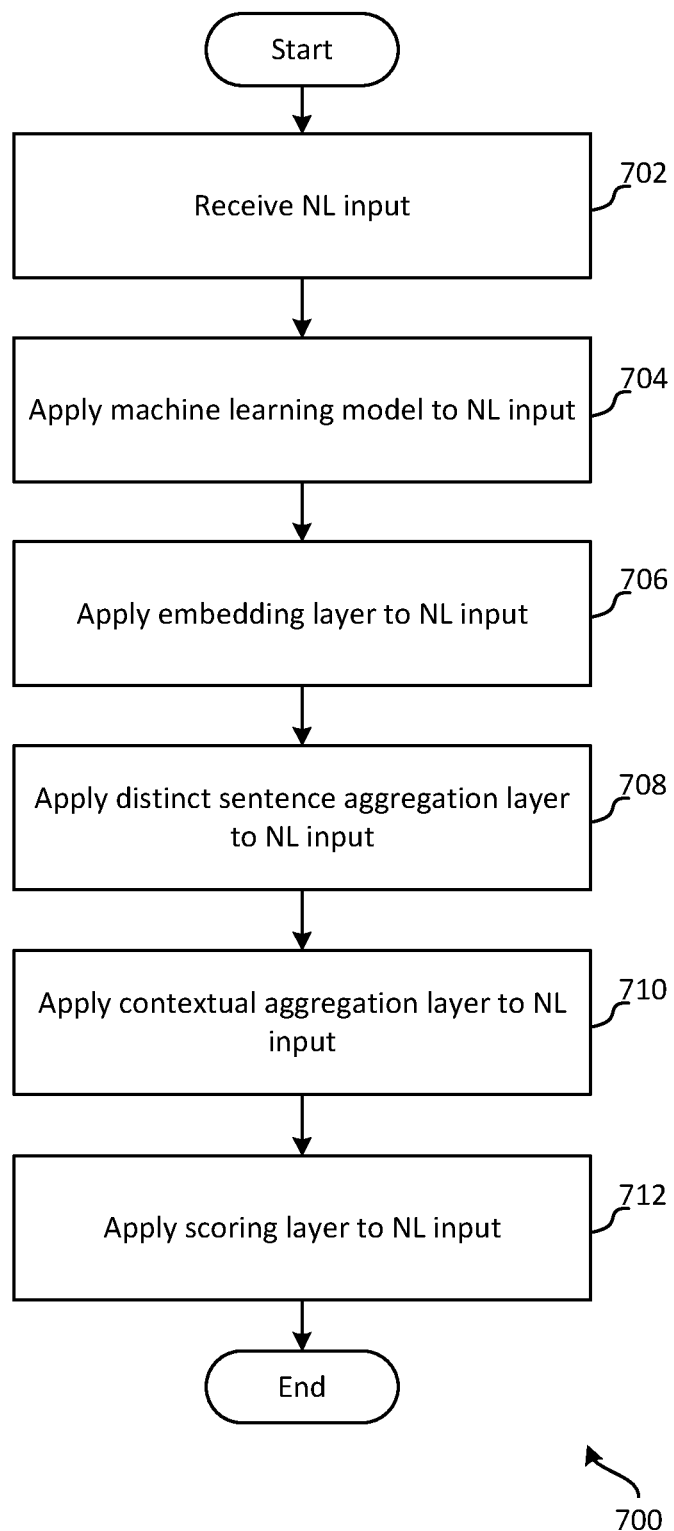
FIG. 7 is an exemplary method for identifying relevant content in an email related to a schedule meeting task intent.

FIG. 7 is an exemplary method 700 for identifying relevant content in an email related to a schedule meeting task intent. The method 700 begins at a start operation and flow moves to operation 702.

At operation 702 a natural language input is received. The natural language input may comprise a plurality of sentences in an email. The natural language input may be received by a task content identification service, a digital assistant service, and/or an event scheduling assistant service. A sentence tokenizer may be applied to the natural language input.

From operation 702 flow continues to operation 704 where a machine learning model is applied to the natural language input. The machine learning model may have been trained to rank sentences based on their relevance to a schedule meeting task. In some examples, the machine learning model may be identified for use in processing the natural language input based on identifying a task type associated with the natural language input.

From operation 704 flow continues to operation 706 where an embedding layer of the machine learning model is applied to each of the plurality of sentences, the embedding layer generating an embedding for each word in the natural language input. The embedding layer may apply a contextual model to each sentence from the natural language input. In examples, the contextual model that is applied may be a BERT model. In other examples, the contextual model may be a Sent2Vec model, Embeddings from Language Models (ELMo), Recurrent Neural Networks model, etc.

From operation 706 flow continues to operation 708 where a distinct sentence aggregation layer of the machine learning model is applied to the word embeddings generated at operation 706. The distinct sentence aggregation layer may aggregate the embeddings for each word in the natural language input into a distinct embedding for each of the plurality of sentences. The distinct sentence aggregation layer may apply a neural network to the embeddings for each word. In examples, the neural network may comprise a GRU or bi-GRU neural network. In other examples, the neural network may comprise an LSTM neural network.

From operation 708 flow continues to operation 710 where a contextual aggregation layer of the machine learning model is applied to the distinct embeddings for each of the plurality of sentences aggregated at operation 706. The contextual aggregation layer may aggregate each distinct embedding for each of the plurality of sentences into a contextual embedding for each of the plurality of sentences. In aggregating the distinct embeddings for each of the sentences, the contextual aggregation layer may apply a neural network to each distinct embedding for each of the sentences. In examples, the neural network may comprise a GRU or bi-GRU neural network. In other examples, the neural network may comprise an LSTM neural network.

From operation 710 flow continues to operation 712 where a scoring layer of the machine learning model is applied to each of the contextual embeddings for each of the plurality of sentences aggregated at operation 710. The scoring layer may score and rank each of the plurality of sentences based on their relevance to the schedule meeting task. In scoring each sentence, the scoring layer may apply a classifier function to each contextual embedding for each of the plurality of sentences (e.g., the embeddings generated by contextual aggregation layer at operation 710). In examples, the classifier function may comprise a sigmoid function. In other examples, the classifier function for scoring sentences may include other different activation functions (tanh, softplus, etc).

From operation 712 flow moves to an end operation and the method 700 ends.

Figure 8:
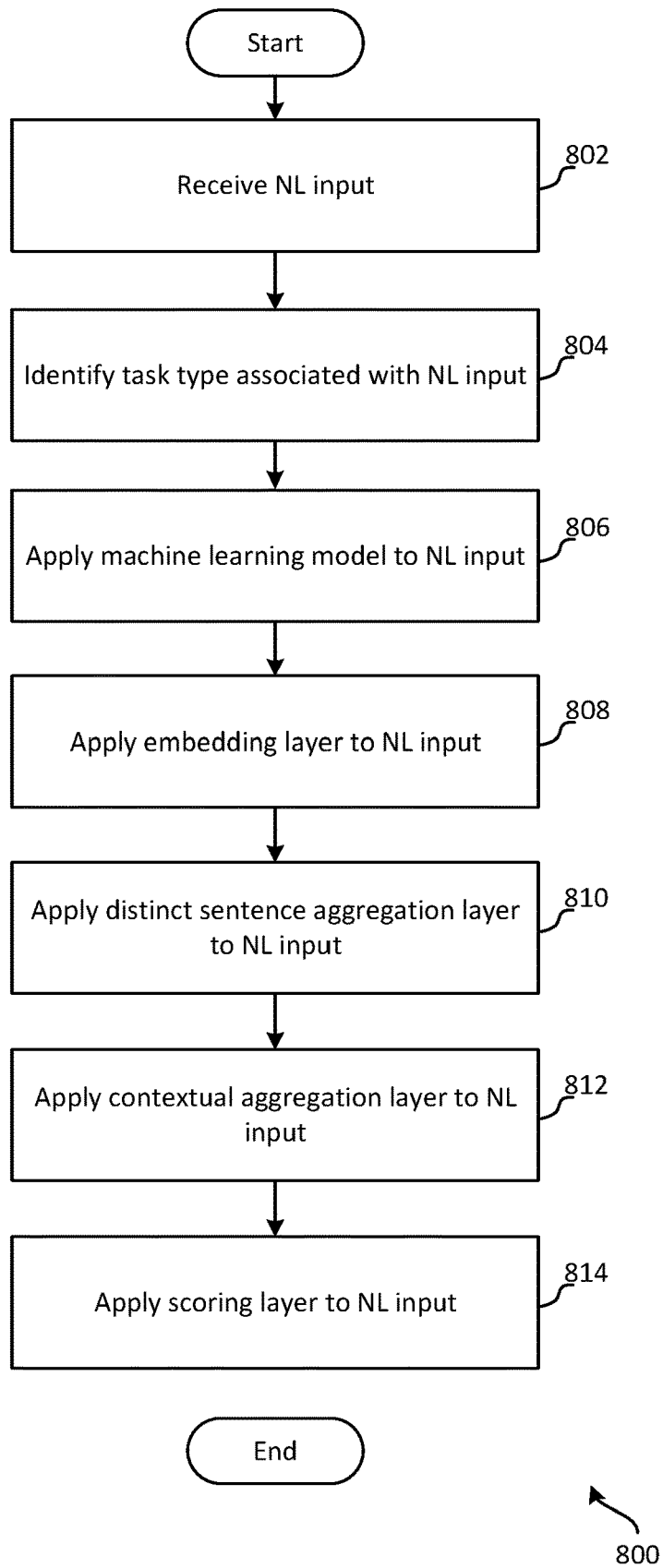
FIG. 8 is an exemplary method for identifying relevant content in a productivity application document related to a task intent.

FIG. 8 is an exemplary method 800 for identifying relevant content in a productivity application document related to a task intent. The method 800 begins at a start operation and flow moves to operation 802.

At operation 802 a natural language input is received. The natural language input may comprise a plurality of sentences in a productivity application document. The productivity application may comprise a word processing application, a spreadsheet application, a presentation application, a note taking application, and/or a messaging application, for example. The natural language input may comprise the entirety of the document, a portion of the document, the body of the document, and/or comments in the document.

From operation 802 flow continues to operation 804 where a task type associated with the natural language input is identified. The task type may be identified via application of one or more natural language processing models. Examples of the task type may include: a "schedule meeting" task type, a "identify sentiment" task type, an "insert object" task type, a "identify object" task type, etc.

From operation 804 flow continues to operation 806 where a machine learning model is applied to the natural language input. The machine learning model may have been trained to score and rank sentences based on their relevance to the identified task type. The sentences may have been tokenized from the natural language input by a sentence tokenizer.

From operation 806 flow continues to operation 808 where an embedding layer is applied to each of the plurality of sentences, the embedding layer generating an embedding for each word in the natural language input. The embedding layer may apply a contextual model to each sentence from the natural language input. In examples, the contextual model that is applied may be a BERT model. In other examples, the contextual model may be a Sent2Vec model, Embeddings from Language Models (ELMo), Recurrent Neural Networks model, etc.

From operation 808 flow continues to operation 810 where a distinct sentence aggregation layer is applied to the word embeddings generated at operation 808. The distinct sentence aggregation layer may aggregate the embeddings for each word in the natural language input into a distinct embedding for each of the plurality of sentences. The distinct sentence aggregation layer may aggregate the embeddings for each word in the natural language input into a distinct embedding for each of the plurality of sentences. The distinct sentence aggregation layer may apply a neural network to the embeddings for each word. In examples, the neural network may comprise a GRU or bi-GRU neural network. In other examples, the neural network may comprise an LSTM neural network.

From operation 810 flow continues to operation 812 where a contextual aggregation layer is applied to the distinct embeddings for each of the plurality of sentences aggregated at operation 810. The contextual aggregation layer may aggregate each distinct embedding for each of the plurality of sentences into a contextual embedding for each of the plurality of sentences. The contextual aggregation layer may aggregate each distinct embedding for each of the plurality of sentences into a contextual embedding for each of the plurality of sentences. In aggregating the distinct embeddings for each of the sentences, the contextual aggregation layer may apply a neural network to each distinct embedding for each of the sentences. In examples, the neural network may comprise a GRU or bi-GRU neural network. In other examples, the neural network may comprise an LSTM neural network.

From operation 812 flow continues to operation 814 where a scoring layer is applied to each of the contextual embeddings for each of the plurality of sentences aggregated at operation 812. The scoring layer may score and rank each of the plurality of sentences based on their relevance to the identified task type. In scoring each sentence, the scoring layer may apply a classifier function to each contextual embedding for each of the plurality of sentences (e.g., the embeddings generated by contextual aggregation layer at operation 812). In examples, the classifier function may comprise a sigmoid function. Other mechanisms for scoring sentences may include other different activation functions (tanh, softplus, etc).

From operation 814 flow moves to an end operation and the method 800 ends.

Figure 9:
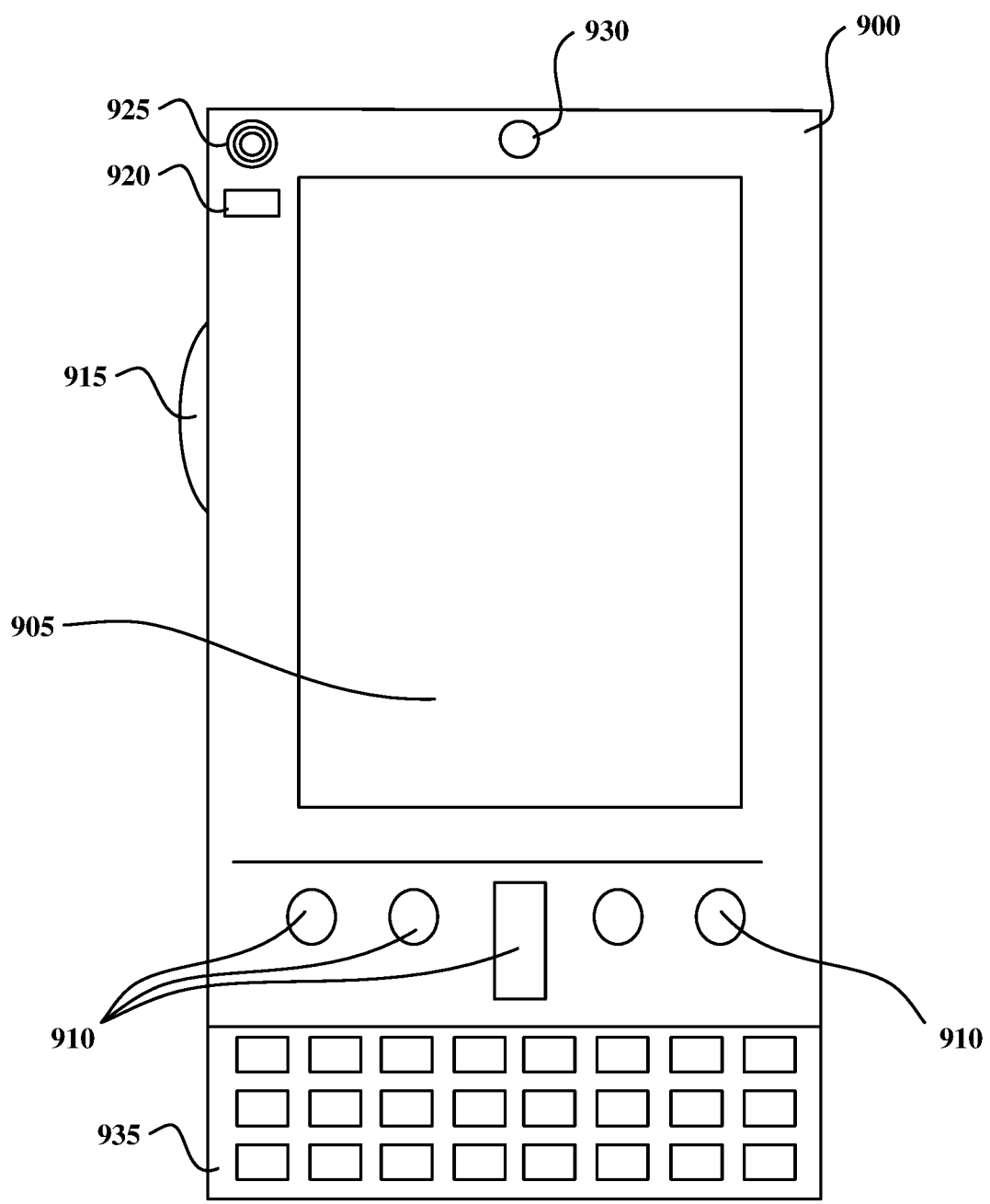
FIGS. 9 and 10 are simplified diagrams of a mobile computing device with which aspects of the disclosure may be practiced.
Figure 10:
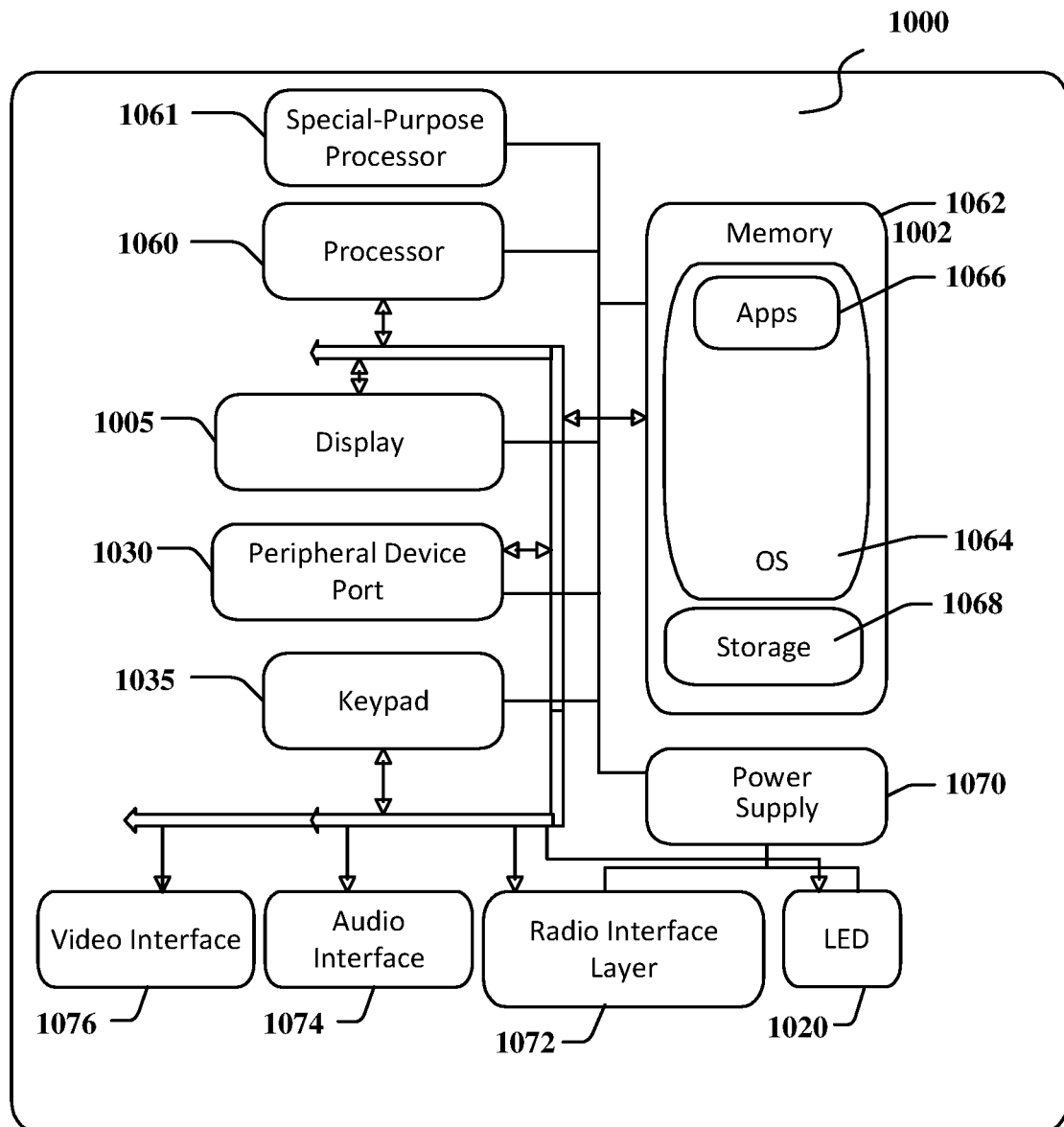

FIGS. 9 and 10 illustrate a mobile computing device 900, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 9, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or fewer input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 10 is a block diagram illustrating the architecture of one aspect of a mobile computing device. That is, the mobile computing device 1000 can incorporate a system (e.g., an architecture) 1002 to implement some aspects. In one embodiment, the system 1002 is implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000, including instructions for providing and operating a task content identification platform.

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 920 may be used to provide visual notifications, and/or an audio interface 1074 may be used for producing audible notifications via the audio transducer 925. In the illustrated embodiment, the visual indicator 920 is a light emitting diode (LED) and the audio transducer 925 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 925, the audio interface 1074 may also be coupled to a microphone to receive audible input, such as to facilitate a telephone conversation. In accordance with embodiments of the present disclosure, the microphone may also serve as an audio sensor to facilitate control of notifications, as will be described below. The system 1002 may further include a video interface 1076 that enables an operation of an onboard camera 930 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10 by the non-volatile storage area 1068.

Data/information generated or captured by the mobile computing device 1000 and stored via the system 1002 may be stored locally on the mobile computing device 1000, as described above, or the data may be stored on any number of storage media that may be accessed by the device via the radio interface layer 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1072 or via a distributed computing network. Similarly, such data/information may be readily transferred between computing devices for storage and use according to well-known data/information transfer and storage means, including electronic mail and collaborative data/information sharing systems.

Figure 11:
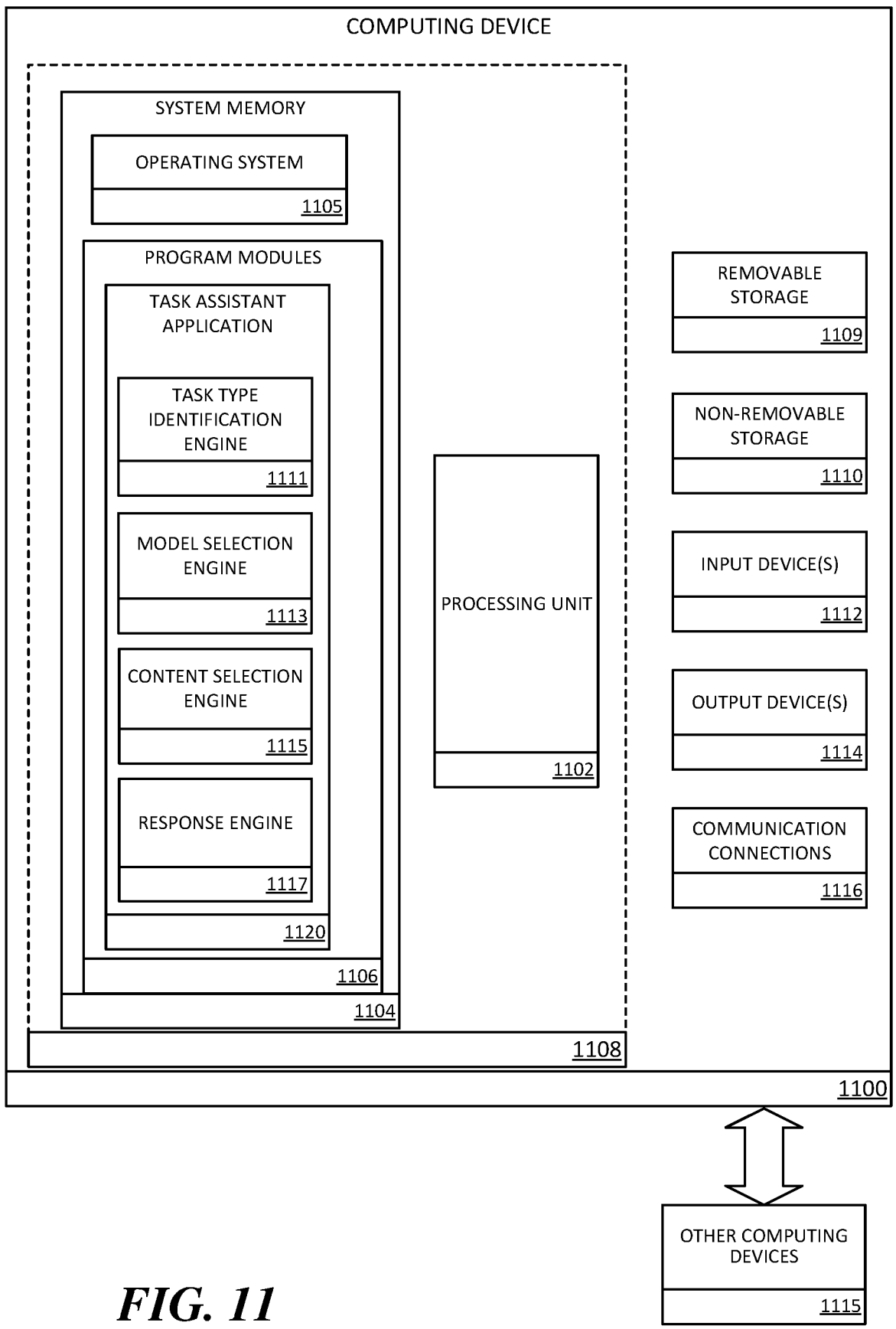
FIG. 11 is a block diagram illustrating example physical components of a computing device with which aspects of the disclosure may be practiced.

FIG. 11 is a block diagram illustrating physical components (e.g., hardware) of a computing device 1100 with which aspects of the disclosure may be practiced. The computing device components described below may have computer executable instructions for assisting with task content identification. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 suitable for running one or more task content identification applications and/or services. The operating system 1105, for example, may be suitable for controlling the operation of the computing device 1100. Furthermore, embodiments of the disclosure may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106 (e.g., task assistant application 1120) may perform processes including, but not limited to, the aspects, as described herein. According to examples, task type identification engine 1111 may perform one or more operations associated with identifying a task type associated with a natural language input in a large document. Model selection engine 1113 may perform one or more operations associated with matching an identified task type to a machine learning model that has been trained to identify relevant content in a natural language input related to the identified task type. Content selection engine 1115 may perform one or more operations associated with applying a layered machine learning model that has been trained to identify relevant content from a natural language input associated with an identified task type. Response engine 1117 may perform one or more operations associated with identifying and executing actions and operations associated with task completion in relation to relevant entities from content (e.g., sentences) that has been identified as relevant to a task type.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1100 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1100 may also have one or more input device(s) 1112 such as a keyboard, a mouse, a pen, a sound or voice input device, a touch or swipe input device, etc. The output device(s) 1114 such as a display, speakers, a printer, etc. may also be included. The aforementioned devices are examples and others may be used. The computing device 1100 may include one or more communication connections 1116 allowing communications with other computing devices 1150. Examples of suitable communication connections 1116 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 12:
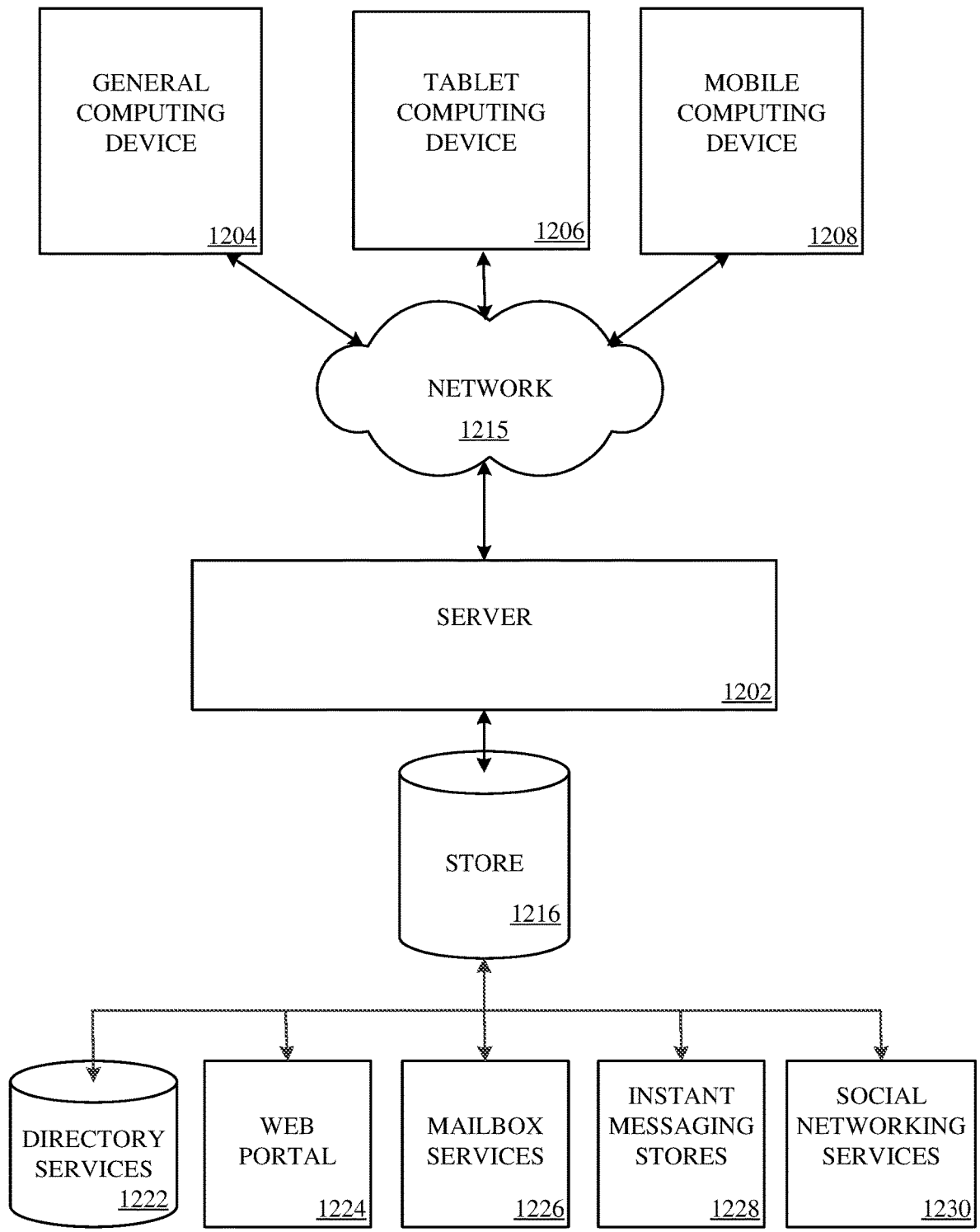
FIG. 12 is a simplified block diagram of a distributed computing system in which aspects of the present disclosure may be practiced.

FIG. 12 illustrates one aspect of the architecture of a system for processing data received at a computing system from a remote source, such as a personal/general computer 1204, tablet computing device 1206, or mobile computing device 1208, as described above. Content displayed at server device 1202 may be stored in different communication channels or other storage types. For example, various documents may be stored using a directory service 1222, a web portal 1224, a mailbox service 1226, an instant messaging store 1228, or a social networking site 1230. The program modules 1106 may be employed by a client that communicates with server device 1202, and/or the program modules 1106 may be employed by server device 1202. The server device 1202 may provide data to and from a client computing device such as a personal/general computer 1204, a tablet computing device 1206 and/or a mobile computing device 1208 (e.g., a smart phone) through a network 1215. By way of example, the computer systems described herein may be embodied in a personal/general computer 1204, a tablet computing device 1206 and/or a mobile computing device 1208 (e.g., a smart phone). Any of these embodiments of the computing devices may obtain content from the store 1216, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for identifying relevant content in a natural language input, the method comprising:
    receiving the natural language input, the natural language input comprising a plurality of sentences in an email;
    applying a machine learning model to the natural language input, wherein the machine learning model has been trained to rank sentences based on their relevance to a schedule meeting task, the machine learning model comprising:
        an embedding layer, the embedding layer generating an embedding for each word in the natural language input;
        a distinct sentence aggregation layer, the distinct sentence aggregation layer aggregating the embeddings for each word in the natural language input into a distinct embedding for each of the plurality of sentences;
        a contextual aggregation layer, the contextual aggregation layer aggregating each distinct embedding for each of the plurality of sentences into a contextual embedding for each of the plurality of sentences; and
        a scoring layer, the scoring layer ranking each of the plurality of sentences based on their relevance to the schedule meeting task.

2. The method of claim 1, wherein generating the embedding for each word in the natural language input comprises applying a contextual model to each of the plurality of sentences.

3. The method of claim 2, wherein the contextual model comprises at least one of: a Word2Vec model; and a BERT model.

4. The method of claim 1, wherein aggregating the embeddings for each word in the natural language input comprises applying a neural network to the embeddings for each word.

5. The method of claim 4, wherein the neural network comprises one of a LSTM neural network; and a GRU neural network.

6. The method of claim 1, wherein aggregating each distinct embedding for each of the plurality of sentences comprises applying a neural network to each distinct embedding for each of the plurality of sentences.

7. The method of claim 6, wherein the neural network comprises one of a LSTM neural network; and a GRU neural network.

8. The method of claim 1, wherein the ranking comprises applying a classifier function to each contextual embedding for each of the plurality of sentences.

9. The method of claim 8, wherein the classifier function comprises an activation function.

10. A system for identifying content in a natural language input, comprising:
    a memory for storing executable program code; and
    one or more processors, functionally coupled to the memory, the one or more processors being responsive to computer-executable instructions contained in the program code and operative to:
        receive the natural language input, the natural language input comprising a plurality of sentences in a productivity application document;
        identify a task type associated with the natural language input;
        apply a machine learning model to the natural language input, wherein the machine learning model has been trained to rank sentences based on their relevance to the identified task type, the machine learning model comprising:
            an embedding layer, the embedding layer generating an embedding for each word in the natural language input;
            a distinct sentence aggregation layer, the distinct sentence aggregation layer aggregating the embeddings for each word in the natural language input into a distinct embedding for each of the plurality of sentences;
            a contextual aggregation layer, the contextual aggregation layer aggregating each distinct embedding for each of the plurality of sentences into a contextual embedding for each of the plurality of sentences; and
            a scoring layer, the scoring layer ranking each of the plurality of sentences based on their relevance to the schedule meeting task.

11. The system of claim 10, wherein the one or more processors are further responsive to the computer-executable instructions contained in the program code and operative to:
    select the machine learning model from a library of machine learning models, wherein each machine learning model in the library has been trained to rank sentences for their relevance to a different task type than each other machine learning model in the library.

12. The system of claim 10, wherein in generating the embedding for each word in the natural language input, the one or more processors are further responsive to the computer-executable instructions contained in the program code and operative to:
    apply a contextual model to each of the plurality of sentences.

13. The system of claim 12, wherein the contextual model comprises at least one of: a Word2Vec model; and a BERT model.

14. The system of claim 10, wherein in aggregating the embeddings for each word in the natural language input, the one or more processors are further responsive to the computer-executable instructions contained in the program code and operative to:
    applying a neural network to the embeddings for each word.

15. The system of claim 14, wherein the neural network comprises one of a LSTM neural network; and a GRU neural network.

16. The system of claim 10, wherein in aggregating each distinct embedding for each of the plurality of sentences the one or more processors are further responsive to the computer-executable instructions contained in the program code and operative to:
    applying a neural network to each distinct embedding for each of the plurality of sentences.

17. The system of claim 16, wherein the neural network comprises one of a LSTM neural network; and a GRU neural network.

18. A computer-readable storage device comprising executable instructions that, when executed by one or more processors, assists with identifying relevant content in a natural language input, the computer-readable storage device including instructions executable by the one or more processors for:

receiving the natural language input, the natural language input comprising a plurality of sentences in an email;

applying a machine learning model to the natural language input, wherein the machine learning model has been trained to rank sentences based on their relevance to a schedule meeting task, the machine learning model comprising:

an embedding layer, the embedding layer generating an embedding for each word in the natural language input;

a distinct sentence aggregation layer, the distinct sentence aggregation layer aggregating the embeddings for each word in the natural language input into a distinct embedding for each of the plurality of sentences;

a contextual aggregation layer, the contextual aggregation layer aggregating each distinct embedding for each of the plurality of sentences into a contextual embedding for each of the plurality of sentences; and a scoring layer, the scoring layer ranking each of the plurality of sentences based on their relevance to the schedule meeting task.

19. The computer-readable storage device of claim 18, wherein the instructions are further executable by the one or more processors for:

sending a meeting query related to one of the top-ranked sentences to a potential meeting invitee.

20. The computer-readable storage device of claim 18, wherein each of the plurality of sentences is identified as a sentence by applying a tokenizer to the natural language input.

* * * * *